L. G. BOORN.
Clothes-Driers.
No. 146,308.  Patented Jan. 13, 1874.
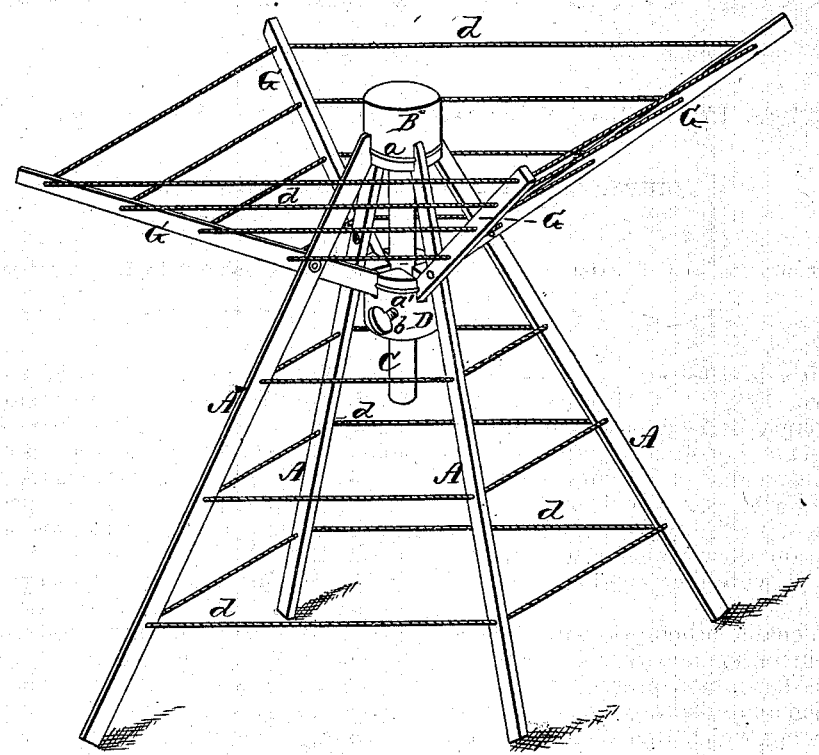
Witnesses:  Inventor.

UNITED STATES PATENT OFFICE.

LESTER G. BOORN, OF RICHMONDVILLE, NEW YORK.

IMPROVEMENT IN CLOTHES-DRIERS.

Specification forming part of Letters Patent No. 146,308, dated January 13, 1874; application filed December 8, 1873.

*To all whom it may concern:*

Be it known that I, L. G. BOORN, of Richmondville, county of Schoharie and State of New York, have invented certain new and useful Improvements in Clothes-Driers, of which the following is a specification:

The nature of my invention consists in the construction and arrangement of a folding clothes-drier, as will be hereinafter more fully set forth.

In order to enable others skilled in the art to which my invention appertains to make and use the same, I will now proceed to describe its construction and operation, referring to the annexed drawing, which represents a perspective view of my clothes-drier.

A A represent four bars, the upper ends of which are placed in slots made at equal distances apart in the lower edge of a hub, B, and there held and pivoted by means of a wire, $a$. This wire is placed in a circumferential groove around the hub and passes through a hole in the upper end of each bar A. These bars form legs upon which the whole clothes-rack is supported. From the center of the hub B a shaft, C, extends perpendicularly downward for a suitable distance, and upon this shaft is placed a hub, D, which is capable of being moved up and down on the same, and held at any point desired by means of a set-screw, $b$. In slots in the upper end of the hub D are, by means of a circumferential wire, $a'$, pivoted four arms, G G, at equal distances apart, which arms are pivoted to the four legs A A, as shown. The legs A A, as well as the arms G G, are connected by means of a series of horizontal cords, $d\ d$.

The clothes-rack or clothes-drier thus constructed can be easily spread out in the position shown in the drawing for use, and held spread out by tightening the set-screw $b$. When not in use it can easily be folded and put away, taking up but little room.

Having thus fully described my invention, what I claim as new, and desire to secure by Letters Patent, is—

The within-described clothes-rack or clothes-drier, consisting of the legs A A, hubs B B, shaft C, arms G G, set-screw $b$, and cords $d\ d$, all constructed substantially as and for the purposes herein set forth.

In testimony that I claim the foregoing as my invention I hereunto affix my signature this 5th day of December, 1873.

LESTER G. BOORN.

Witnesses:
J. C. SMITH,
JOHN ZEH.